(12) United States Patent
Hergenrother et al.

(10) Patent No.: US 6,384,150 B2
(45) Date of Patent: May 7, 2002

(54) ANIONIC POLYMERIZATION INITIATORS FOR PREPARING MACRO-BRANCHED DIENE RUBBERS

(75) Inventors: William L. Hergenrother, Akron; William M. Cole, Clinton, both of OH (US); Theodore J. Knutson, Edina, MN (US); Georg G. A. Böhm, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/852,507

(22) Filed: May 10, 2001

Related U.S. Application Data

(62) Division of application No. 09/569,253, filed on May 11, 2000, now Pat. No. 6,271,314, which is a division of application No. 09/042,096, filed on Mar. 13, 1998, now Pat. No. 6,136,914.

(51) Int. Cl.$^7$ ............... C08C 19/26; C08F 8/42; B01J 31/06
(52) U.S. Cl. ............... 525/366; 525/369; 502/157
(58) Field of Search ............... 525/366, 369; 502/157

(56) References Cited

U.S. PATENT DOCUMENTS

| | | | |
|---|---|---|---|
| 3,703,566 A | 11/1972 | Duck et al. | |
| 4,129,701 A | 12/1978 | Jezl et al. | |
| 4,297,451 A | * 10/1981 | Uraneck et al. | 525/366 |
| 4,429,091 A | 1/1984 | Hall | |
| 4,476,240 A | 10/1984 | Hall et al. | |
| 4,520,123 A | 5/1985 | Hall | |
| 4,707,521 A | 11/1987 | Esneault et al. | |
| 4,761,456 A | 8/1988 | Lund et al. | |
| 4,861,742 A | 8/1989 | Bronstert et al. | |
| 5,159,023 A | * 10/1992 | Cecchin et al. | |
| 5,208,303 A | 5/1993 | Bailly | |
| 5,221,716 A | 6/1993 | Jalics et al. | |
| 5,238,893 A | 8/1993 | Hergenrother et al. | |
| 5,252,688 A | 10/1993 | Bailly et al. | |
| 5,264,506 A | 11/1993 | Eisinger et al. | |
| 5,268,413 A | 12/1993 | Antkowiak et al. | |
| 5,268,439 A | 12/1993 | Hergenrother et al. | |
| 5,317,036 A | 5/1994 | Brady, III et al. | |
| 5,329,005 A | 7/1994 | Lawson et al. | |
| 5,332,810 A | 7/1994 | Lawson et al. | |
| 5,354,822 A | 10/1994 | Antkowiak et al. | |
| 5,633,323 A | * 5/1997 | Lutz et al. | 525/271 |
| 5,652,304 A | 7/1997 | Calderon et al. | |
| 5,665,826 A | 9/1997 | Halasa et al. | |
| 5,674,799 A | * 10/1997 | Nugay et al. | 205/157 |
| 6,071,847 A | 6/2000 | Cole et al. | |

FOREIGN PATENT DOCUMENTS

| | | |
|---|---|---|
| CA | 2133526 | 3/1994 |
| EP | 0 475 603 A1 | 3/1992 |
| GB | 1 451 280 | 9/1976 |
| JP | 62-156104 | * 12/1987 |
| RU | 227583 | * 7/1964 |
| WO | WO 96/04321 | 2/1996 |
| WO | WO 97/08211 | 3/1997 |

* cited by examiner

*Primary Examiner*—Tae H. Yoon
(74) *Attorney, Agent, or Firm*—Meredith Palmer; Barbara Arndt

(57) ABSTRACT

Novel solid supported anionic polymerization initiators that are multiply metalated with Group IA alkali metal atoms are provided and employed to produce extremely high molecular weight branched diene polymers. The initiators are prepared by metalating a particle comprising a thermoplastic polymer or a cured elastomer in the presence of a polar coordinator. The polymers obtained by anionic polymerization employing the initiators are multiply branched, with a polymer chain covalently attached to the particle at virtually every metalation site. The macro-branched polymers exhibit desirable properties, such as an extremely high molecular weight, a controlled molecular weight distribution, $T_g$ and vinyl content, and the ability to readily absorb hydrocarbon solvents and oils. The polymers are easily compounded to form vulcanizable elastomeric compounds and articles that have excellent resistance to wear and tear and exhibit reduced hysteresis properties.

10 Claims, 3 Drawing Sheets

ANIONIC POLYMERIZATION INITIATORS FOR PREPARING MACRO-BRANCHED DIENE RUBBERS

This application is a divisional of U.S. patent application Ser. No. 09/569,253, filed May 11, 2000, now U.S. Pat. No. 6,271,314, which is a divisional of U.S. Ser. No. 09/042,096, filed Mar. 13, 1998, now U.S. Pat. No. 6,136,914.

BACKGROUND OF THE INVENTION

The invention relates to anionic polymerization resulting in very high molecular weight, highly branched diene polymers. More particularly, the invention relates to novel multiply-metalated, solid supported anionic polymerization initiators that are useful for producing such polymers. The macro-branched polymers synthesized by the process of the invention exhibit desirable properties, such as the ability to absorb hydrocarbon solvents and oils, and are readily compounded to form vulcanizable elastomeric compounds and articles that have excellent resistance to wear and tear and exhibit reduced hysteresis properties.

When producing polymers for use in rubber articles, such as tires, power belts, and the like, it is desirable that these polymers are easily processible during compounding and have a high molecular weight with a controlled molecular weight distribution, glass transition temperature ($T_g$) and vinyl content. It is also desirable that reinforcing fillers, such as carbon black, be well dispersed throughout the rubber in order to improve various physical properties. This dispersion can be achieved, for example, by end capping polydienes by reacting a metal terminated polydiene with an end capping agent, or by utilizing functionalized anionic polymerization initiators such as lithium-based amine or amide initiators that incorporate a functional group onto one or both ends of the polymer chain. Rubber articles produced from vulcanized elastomers exhibiting these properties, will have reduced hysteresis resulting in an increase in rebound, a decrease in rolling resistance and less heat build-up when mechanical stresses are applied.

Anionic polymerization initiators based on lithium are well known for producing linear polydiene homopolymers and copolymers. Lithium-based macrocyclic anionic polymerization initiators have also been described in U.S. Pat. Nos. 5,677,399 and 5,700,888. These initiators are utilized to form stable macrocyclic polymers that have low viscosities at high molecular weights and thus provide for enhanced polymer processibility during molding, extruding and the forming of films. Such polymers can be compounded to form vulcanizable elastomeric compounds and articles that exhibit reduced hysteresis properties.

There is still a need, however, for anionic polymerization initiators that can be used to synthesize high molecular weight linear polymers that are easily processible and have the desirable properties described above.

SUMMARY OF THE INVENTION

The present invention provides novel solid supported anionic polymerization initiators that are multiply metalated and are useful for producing extremely high molecular weight branched diene polymers. In particular, an advantage of the invention is that the macro-branched diene polymers are prepared using the invention initiators under normal conditions for an anionic polymerization process while the initiators are in suspension in a solution of monomers. Moreover, the initiators of the present invention are also suitable for use in gas phase anionic polymerization of conjugated diene monomers, as disclosed in U.S. Pat. No. 6,071,847, the disclosure of which is hereby incorporated by reference. Because of their extremely high molecular weight and controlled molecular weight distribution, $T_g$ and vinyl content, the polymers produced by anionic polymerization employing the invention initiators are useful for producing many different high performance vulcanates. The macro-branched polymers synthesized by the process of the invention also exhibit other desirable properties, such as the ability to readily absorb hydrocarbon solvents and oils, and they are easily compounded to form vulcanizable elastomeric compounds and articles that have excellent resistance to wear and tear and exhibit reduced hysteresis properties.

In particular, the anionic polymerization initiators of the invention have the formula $P(Me)_n$, wherein P is a metalatable particle having a diameter of about 1 micron to about 1000 microns comprising a thermoplastic polymer or a cured elastomer. The particle is multiply-metalated with a Group IA alkali metal (Me). The number of metal atoms covalently bound to the particle ranges from n=3 to n=a multiplicity of atoms, $10^x$ (e.g., $10^{10}$). The alkali metal atoms bonded to a single particle may all be the same or may be different from each other. The metal atoms may be any Group IA alkali metal including lithium, sodium, potassium, rubidium, cesium and francium. Preferably the metal atoms are selected from lithium, sodium and potassium and, more preferably, are a mixture of lithium atoms and at least one of sodium atoms and potassium atoms. Most preferably, all of the alkali metal atoms are the same and are lithium atoms.

As used in the context of the invention, the term "metalated" refers to an acid:base reaction, known to those skilled in the art, involving the transfer of a metal atom from a strong base to a more acidic polymer with the concomitant transfer of a hydrogen atom from the polymer to the base, thus forming a polymer carbon-metal covalent bond. A "metalatable" thermoplastic polymer or cured elastomer is one that can participate in this reaction and become metalated.

The above described anionic polymerization initiators are used to homopolymerize conjugated diolefin monomers having from about 4 to about 12 carbon atoms, and to copolymerize the conjugated diolefin monomers with monovinyl aromatic monomers having from about 8 to about 20 carbon atoms, to prepare a macro-branched diene homopolymer or copolymer having the formula

prior to quenching, wherein P, Me and n are the same as previously described and (polymer) represents a polymer chain covalently bonded to the particle. The polymerization reaction is terminated with a terminating or a functionalizing agent. The resulting polymers have a low $T_g$, preferably less than −20° C., more preferably less than −30° C., and most preferably less than −35° C., and are readily usable in rubber products such as tires.

The invention provides the initiators, the macro-branched diene polymer, a vulcanizable elastomer composition formed from the polymer, and a tire having at least one component formed from the vulcanizable elastomer composition. The vulcanizable elastomer composition may comprise the invention polymer only or may comprise a blend of the invention polymer and at least one other polymer, such as styrene-butadiene rubber, natural rubber, polyisoprene, poly-(ethylene propylene diene monomer), and the like.

The invention further provides a method for preparing the anionic polymerization initiators described above, comprising the step of reacting (i) an alkali metal compound having the formula R(Me), where R represents a hydrocarbyl group containing from one to about 20 carbon atoms, and Me is a Group IA alkali metal atom, with (ii) a particle as defined above, in the presence of (iii) a polar coordinator, to form the reaction product having the formula $P(Me)_n$, where P represents the particle having covalently bonded alkali metal atoms and n is the same as previously described. The molar ratio of the polar coordinator to the alkali metal compound is about 0.03:1 to about 4:1, preferably about 0.05:1 to about 1:1, and more preferably about 0.06:1 to about 0.5:1.

DETAILED DESCRIPTION OF THE INVENTION

The invention provides a novel solid supported anionic polymerization initiator for anionic polymerization of conjugated diolefin monomers having from about 4 to about 12 carbon atoms, and copolymerization of the conjugated diolefin monomers together with monovinyl aromatic monomers having from about 8 to about 20 carbon atoms, as described below, to form a macro-branched diene polymer. The initiator has the formula $$P(Me)_n$$

where P is a metalatable particle having a diameter of about 1 micron to about 1000 microns comprising a thermoplastic polymer or a cured elastomer, Me is a Group IA alkali metal covalently bonded to the particle, and n is an integer equal to or greater than 3. More preferably, n represents a multiplicity of alkali metal atoms (Me), $10^x$  (e.g., $10^{10}$), and the particle comprises a multiplicity of covalently bonded alkali metal atoms.

The metal atoms may be any Group IA alkali metal including lithium, sodium, potassium, rubidium, cesium and francium. Although rubidium, cesium and francium are usable in the invention initiator, their use is less preferred because they are comparatively expensive. Therefore, the metal atoms are preferably lithium, sodium or potassium atoms, and more preferably are a mixture of lithium atoms and sodium atoms and/or potassium atoms. Most preferably, all of the alkali metal atoms are lithium.

The alkali metal atoms on a single particle may all be the same or may be different from each other, depending on the alkali metal compound(s) used for the preparation of the initiator, as described below. For example, the use of a single alkali metal compound, such as an alkyl lithium, an alkyl sodium, an alkyl potassium or another Group IA alkyl metal compound produces particles metalated with a single type of metal. However, the use of a mixture of an alkyl lithium compound together with an alkyl sodium compound and/or an alkyl potassium compound and/or another Group IA alkyl metal compound as a co-agent for metalation produces particles metalated with lithium, as well as sodium and/or potassium and/or the other metal. Preferably, an alkyl lithium compound alone is used in the preparation of the initiators, resulting in a particle metalated only with lithium.

Figure 1:
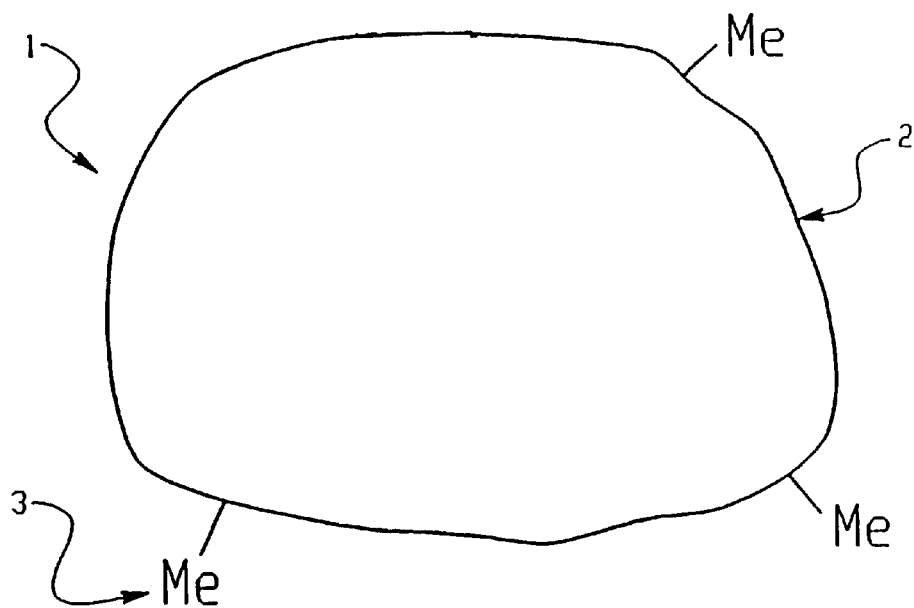
FIG. 1 is a schematic illustration of an invention initiator comprising a particle metalated with three alkali metal atoms.
Figure 2:
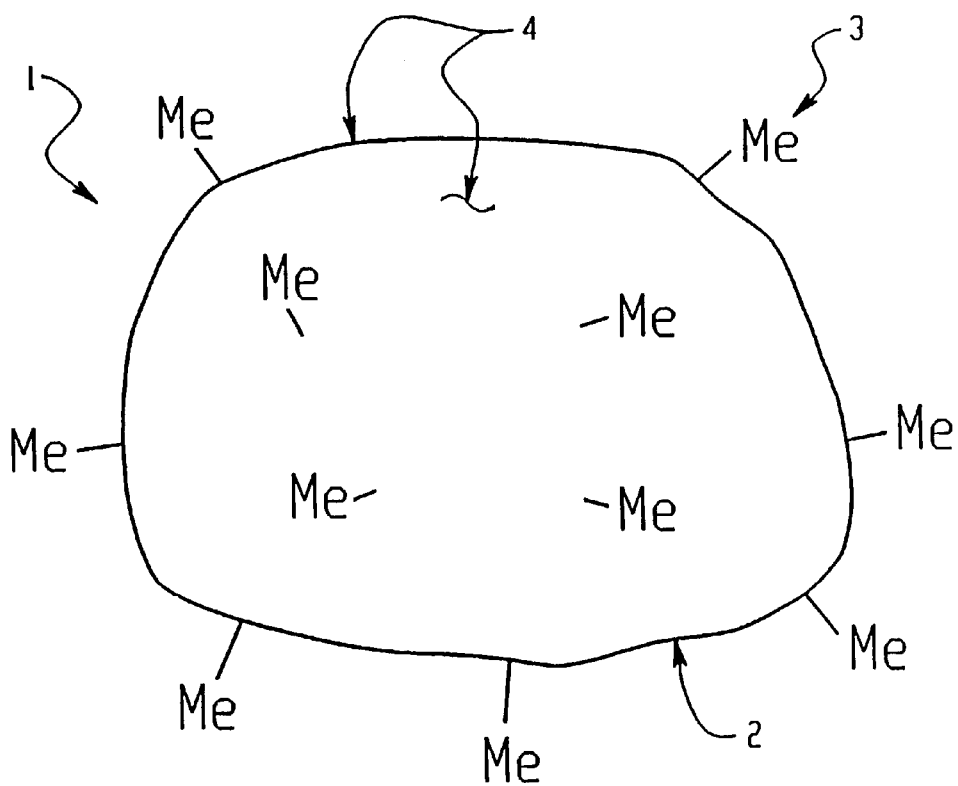
FIG. 2 is a schematic illustration of the initiator of FIG. 1 metalated with a multiplicity of surface-bound alkali metal atoms.
Figure 3:
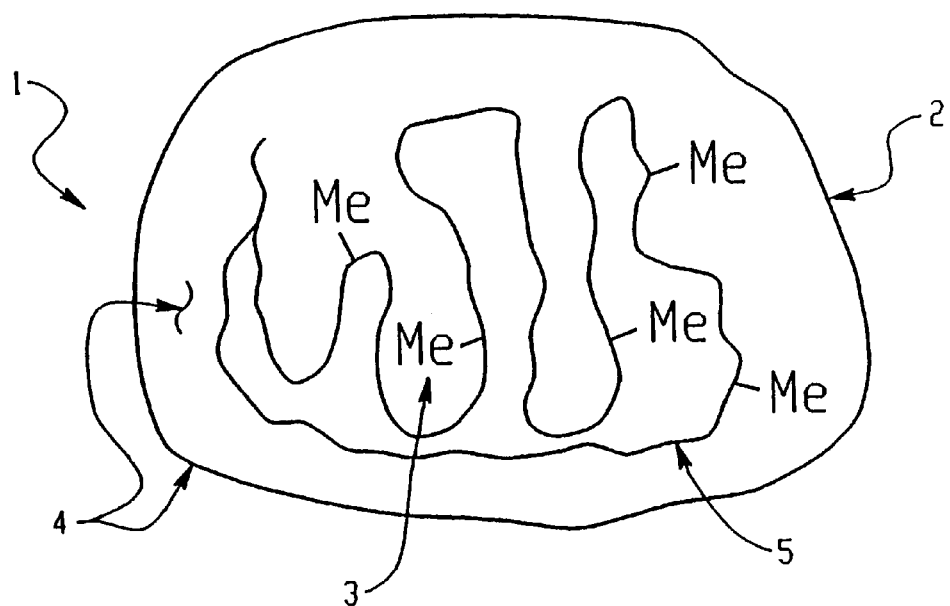
FIG. 3 is a schematic illustration of an invention initiator comprising the particle where the inner matrix of the particle is multiply metalated.
Figure 4:
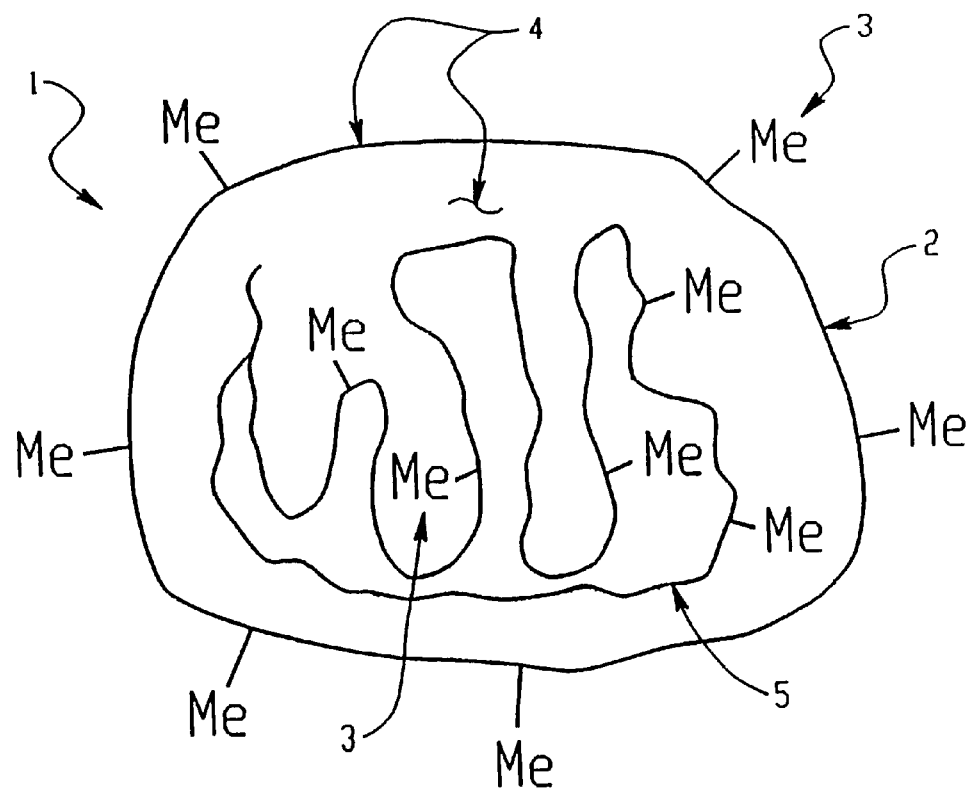
FIG. 4 is a schematic illustration of an invention initiator comprising the particle where both the surface and the inner matrix of the particle are multiply metalated.

Schematic illustrations of the invention initiator are presented in FIGS. 1-4. In one embodiment of the invention illustrated in FIG. 1, the initiator 1 comprises a thermoplastic polymer particle or a cured elastomer particle 2 having carbon atoms to which three (n=3) alkali metal atoms (Me) 3 are covalently bonded, each to a different carbon atom. In a preferred embodiment illustrated in FIG. 2, the particle 2 has a multiplicity of alkali metal atoms 3 bonded to a multiplicity of carbon atoms on the particle. The particle 2 comprises an outer surface 4 and an inner matrix 5. Thus, as illustrated in FIGS. 2-4, the alkali metal atoms 3 may be covalently bonded to the outer surface 4 (FIG. 2), or to the inner matrix 5 (FIG. 3), or to both the outer surface 4 and the inner matrix 5 (FIG. 4).

In one embodiment of the invention, the particle comprises a metalatable thermoplastic polymer. Suitable metalatable thermoplastic polymers for use in the invention include, but are not limited to, polyethylene, polypropylene, polystyrenes, substituted polystyrenes, and the like. Other such metalatable thermoplastic polymers are well known to those skilled in the art. The thermoplastic polymer preferably has a $T_g$ of 80° C. to about 300° C. Thus, when employed as the particle portion of the anionic polymerization initiator to produce the macro-branched polymers illustrated in FIG. 5, the particle remains as part of the macro-branched polymer complex. When these macro-branched polymers are compounded, the processing temperatures are higher than the $T_g$ of the thermoplastic polymer particle and allow the breakup of the thermoplastic particle into smaller particles that could, in the limit, contain only one polymer/elastomer chain attached to the particle, thus allowing for better processibility of the polymers.

In another embodiment of the invention, the particle comprises a metalatable cured elastomer. The cured elastomer may be any metalatable cured elastomer known to those skilled in the art, including compounded cured rubber, such as scrap tire rubber. Exemplary cured elastomers suitable for use in the invention are styrene butadiene rubber, natural rubber, polybutadiene, polyisoprene, and the like. Other such metalatable cured elastomers are well known to those skilled in the art. Because some oils, curing agents and other ingredients in compounded cured rubber may interfere with the metalation of the particle using an alkali metal compound, the compounded cured rubber particle is preferably extracted with acetone for at least 16 hours to substantially remove at least the curing agents, prior to use in preparation of the initiator. When the macro-branched polymers that include the cured elastomeric particles described above are compounded or milled, the points of attachment of the polymers to the particles are shear-degraded, thus allowing for better processibility of the polymers.

The particles, having a diameter of about 1 to about 1000 microns, may be conveniently sized by passing them through a mesh of fixed pore size, as is well known in the art. For example, 20-mesh particles are about 841 microns or less in diameter; 200-mesh particles are about 74 microns or less; and 400-mesh particles are about 37 microns or less. The number of metalation sites on the particles depends on the size of the particles, the concentrations of the alkali metal compound and the polar coordinator employed in the metalation reaction, the process times and temperatures, and the like.

To prepare the anionic polymerization initiator, the method comprises the step of reacting (i) an alkali metal compound having the formula R(Me), where R represents a hydrocarbyl group containing from one to about 20 carbon atoms and Me is a Group IA alkali metal, with (ii) a particle as described above, in the presence of (iii) a polar coordinator. The polar coordinator is an activator of the Group IA alkali metal atom and, as known to one skilled in the art, is required for the formation of the carbon atom-metal atom covalent bond during metalation of the particle.

In general, the initiators according to the present invention can be prepared, under anhydrous and anaerobic conditions, by forming a suspension of the thermoplastic polymer or cured elastomer particles described above in an anhydrous hydrocarbon solvent, such as cyclohexane, hexane, benzene, toluene, pentane, heptane, and the like, in a dry nitrogen atmosphere. To this suspension is then added a polar coordinator, followed by the addition of an alkali metal compound, described below, in the same or a similar solvent. The molar ratio of the polar coordinator to the alkali metal compound ranges from about 0.03:1 to about 4:1, preferably about 0.05:1 to about 1:1, and more preferably about 0.06:1 to about 0.5:1. The optimum amount of particles present in the reaction mixture varies with the selected ratio of polar coordinator to alkali metal compound, the type of particle employed, the particle diameter, and the degree of metalation desired. One skilled in the art will be able to select the proper amount of particles by examining the exemplary data reported herein in Table 1. The various reaction temperatures and times which may be employed to prepare the initiators are known to one skilled in the art of anionic polymerization initiator preparation.

The alkali metal compound employed in the preparation of the solid supported anionic initiators has the formula R(Me), where Me is a metal of Group IA of the Periodic Table of the Elements preferably selected from lithium, sodium and potassium, and more preferably is lithium, and R is a hydrocarbyl group having from one to about 20 carbon atoms. Although lithium alkali metal compounds are most preferred in the method, sodium and/or potassium and/or other Group IA alkali metal compounds may also be separately employed. Preferably, however, these other compounds are used in a mixture with a lithium compound and the sodium and/or potassium and/or other Group IA compound acts as a co-agent with the lithium compound for metalation. Thus, as described above, the resulting particles may be metalated with one or more types of alkali metal atoms derived from the alkali metal compound(s).

Typical R groups include aliphatic and cyclo-aliphatic groups such as alkyls, cycloalkyls, alkenyls, alkynyls, aryls and aralkyls. Specific examples of R groups include, but are not limited to, methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, combinations of these, and the like. A preferable alkali metal compound for use in preparing the initiators of the invention is n-butyl lithium.

Each metalated particle thus prepared is a solid supported initiator that is stable for at least a month or more and is useful for anionic polymerization of anionically-polymerizable monomers to yield a macro-branched polymeric product. Because of the polymeric nature of the particles, each particle readily absorbs the hydrocarbon solvent and is thus is best described as a highly swollen particle. For example, each gram of a 200-mesh scrap rubber particle may contain two to five grams of a solvent in its inner matrix.

As described above, the swollen particle is metalated with at least three or, preferably, a multiplicity of metal atoms, depending on the selected reaction conditions. Metalation of the particle occurs in the presence of a polar coordinator associated with the polymer carbon-metal bond. Such metalation reactions employing a polar coordinator are known to those skilled in the art. The polar coordinator remains associated with the carbon-metal bond of the initiator throughout the anionic polymerization process. However, the presence of the polar coordinator associated with the initiator results in a modification of diene polymerization that gives a reduced level of 1,4 incorporation of monomers and a concomitant increase in the $T_g$ of the polymer produced (i.e., the higher the concentration of the polar coordinator in the polymerization reaction mixture, the higher is the glass transition temperature ($T_g$) of the resulting diene polymer). The conventional procedure for preparing a standard (non-invention) metalated polymer from an alkali metal compound and a polar coordinator employs a molar ratio of the polar coordinator to the alkali metal of about 2:1. However, if a ratio of 2:1 were employed to multiply metalate the invention initiators which are subsequently used to polymerize conjugated diene monomers, the polymerization result would be a high $T_g$ graft copolymer product (e.g., a very high vinyl polybutadiene grafted onto a low vinyl 1,4-polybutadiene). It is an object of the present invention to produce polymers having a low $T_g$, preferably less than $-20°$ C., more preferably less than $-30°$ C., and most preferably less than $-35°$ C., for use in rubber products, such as tires. Therefore, it is desirable to prepare the present initiators in the presence of a lower than standard molar ratio of polar coordinator to alkali metal compound. Surprisingly, it has been discovered herein that not only can the molar ratio of the polar coordinator to the alkali metal compound be reduced to less than 2:1, but the degree of metalation of the particle is actually increased when the molar ratio of the polar coordinator to the alkali metal compound is decreased to values as low as about 0.03:1.

Compounds useful as polar coordinators are organic and include, but are not limited to, tetrahydrofuran, linear and cyclic oligomeric oxolanyl alkanes such as 2-2'-di (tetrahydrofuryl) propane, dipiperidyl ethane, dimethyl ether, pentamethyl diethylenediamine, diazabicyclooctane, hexamethylphosphoramide, N-N'-dimethylpiperazine, diethyl ether, tributylamine and the like. The linear and cyclic oligomeric oxolanyl alkane polar coordinators are described in U.S. Pat. No. 4,429,091, the subject matter of which regarding polar solvents is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; fully alkylated diamines such as tetramethylethylene diamine (TMEDA); and fully alkylated triamines.

The initiators prepared according to the method of the invention are employed with an anionically-polymerizable monomer to yield macro-branched diene polymers having the formula

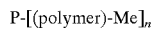

prior to quenching, where P, Me and n are the same as described above, and (polymer) represents a polymer chain covalently bonded to the particle, wherein the polymer component of the polymer chain is preferably selected from conjugated diolefin monomers having from about 4 to about 12 carbon atoms, and copolymers and terpolymers of the conjugated diolefin monomers together with monovinyl aromatic monomers having from about 8 to about 20 carbon atoms. Preferably, the monomers are selected from styrene, butadiene, isoprene, and mixtures of these. As described below, vulcanizable elastomer compositions are prepared from the macro-branched diene polymers by compounding the polymers with about 5 to about 80 parts by weight of carbon black per 100 parts by weight of the polymer. Preferably, the vulcanizable elastomer composition comprises a selection from the group consisting of styrene butadiene rubber, polybutadiene rubber, polyisoprene rubber, isoprene butadiene rubber, terpolymer rubbers of styrene, butadiene and isoprene, and mixtures of these rubbers.

A method of preparing a macro-branched diene polymer having the formula

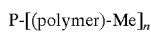

P-[(polymer)-Me]$_n$ prior to quenching, comprises the step of polymerizing at least one monomer selected from the group consisting of conjugated diolefin monomers having from about 4 to about 12 carbon atoms and monovinyl aromatic monomers having from about 8 to about 20 carbon atoms, in the presence of an anionic polymerization initiator having the formula P(Me)$_n$, wherein P represents the particle metalated with n covalently bonded alkali metal atoms, as described above.

Typically, the initiator is used to polymerize unsaturated hydrocarbon monomers such as butadiene, isoprene and the like, and copolymers thereof with monovinyl aromatics such as styrene and its derivatives such as α-methyl styrene, p-methyl styrene and the like. Thus, the macro-branched elastomeric products include diene homopolymers from monomer A and copolymers thereof with monovinyl aromatic monomers B. Exemplary diene homopolymers are those prepared from conjugated diolefin monomers having from 4 to about 12 carbon atoms. Exemplary vinyl aromatic copolymers are those prepared from monomers having from 8 to about 20 carbon atoms. Preferred macro-branched elastomers include diene homopolymers, such as polybutadiene and polyisoprene, copolymers, such as styrene butadiene rubber and isoprene butadiene rubber, and terpolymers consisting of styrene, butadiene and isoprene. Copolymers and terpolymers can comprise from about 99 to 10 percent by weight of diene units and from about 1 to about 90 percent by weight of monovinyl aromatic units, totaling 100 percent. The polymers, copolymers and terpolymers of the present invention may have 1,2-microstructure contents ranging from about 10 to about 80 percent, with the preferred polymers, copolymers or terpolymers having 1,2-microstructure contents of from about 25 to 65 percent, based upon the diene content.

The elastomeric copolymers are preferably random copolymers which result from simultaneous copolymerization of the monomers A and B with randomizing agents, as is known in the art. Block copolymers, poly (b-styrene-b-butadiene-b-styrene) are thermoplastic elastomers, sometimes referred to as S-B-S polymers.

Figure 5:
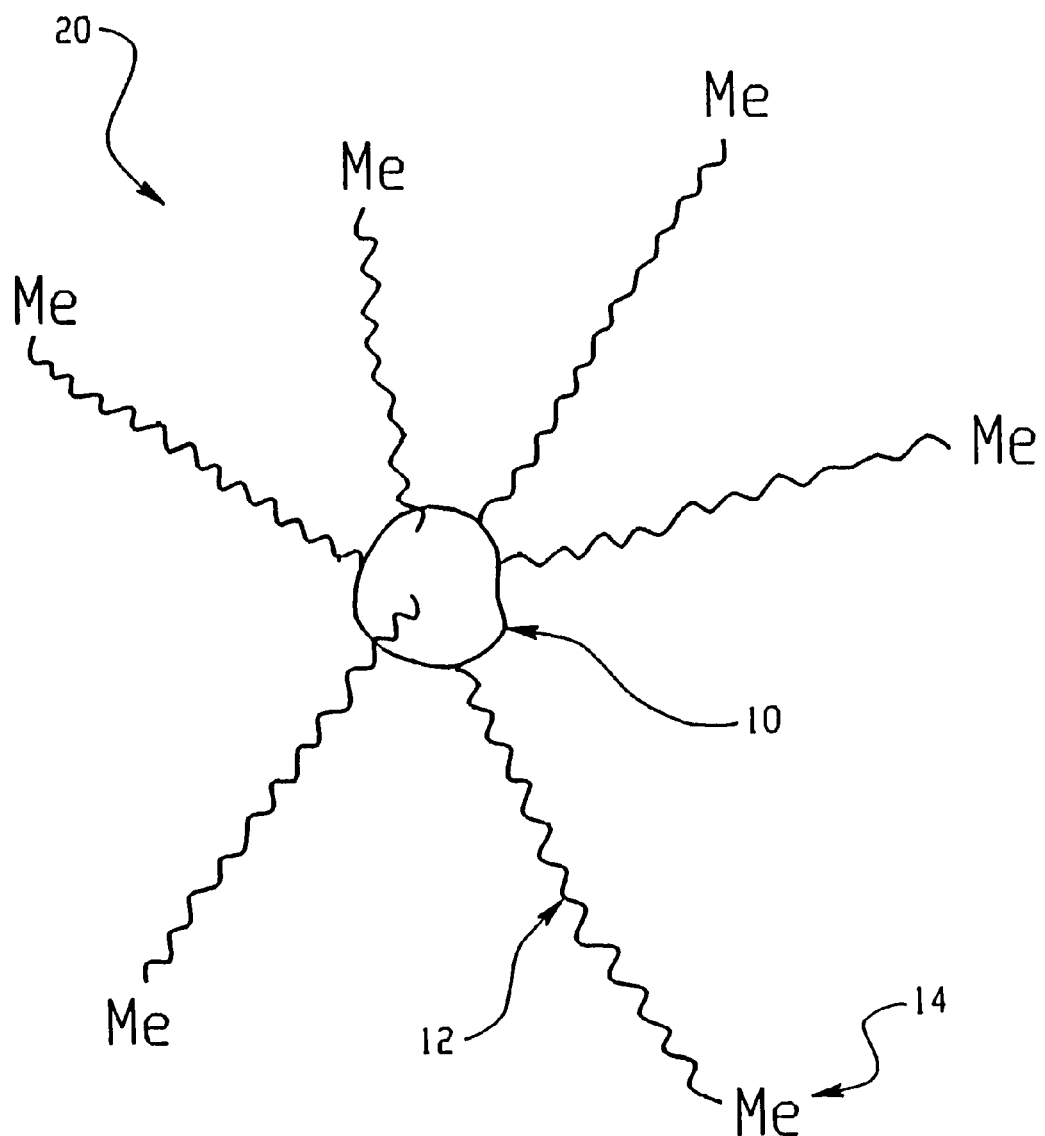
FIG. 5 is a schematic illustration of the macro-branched diene polymer formed with the invention initiator.

The initiators of the present invention form "living" macro-branched diene polymers from the foregoing monomers. FIG. 5 is a schematic representation of a macro-branched polymer 20 produced employing the invention initiators. A polymer chain 12 can potentially be polymerized from each metalated site of the highly swollen particle 10. However in practice, where there are a large multiplicity of metalated sites, it is likely some of the sites may be unavailable because they may be concealed or partially concealed by adjacent growing polymer chains and the like. In this case, at least a majority of the metalated sites are available to produce polymer chains. The metal atom 14 is carried on the living end of the polymer chain prior to quenching. As described above, each particle may comprise from three to a multiplicity of polymer chains. Moreover, polymer chains may be produced at metalated sites in the inner matrix of the particle, since polymerizable monomers are dissolved in solvent that can enter the particle and are also soluble in both the particle and in the growing polymer chains.

The polymer chains may be any of the foregoing diene homopolymers, monovinyl aromatic homopolymers, diene/monovinyl aromatic random copolymers, block copolymers, or mixtures of any of the foregoing. Typically, about 0.5% to about 1% of the polymer product may comprise the original particle used in the initiator. However, the concentration of the particle in the product can be changed by varying parameters such as the degree of metalation of the particles, e.g., by changing the initiator preparation ingredient concentrations, the particle sizes, and the like, or changing the concentration of monomers in the polymerization reactions, and the like.

Polymerization is usually conducted in a conventional hydrocarbon solvent for anionic polymerizations, such as cyclohexane, hexane, benzene, toluene, pentane, heptane, and the like. Various techniques for solution polymerizations, such as batch, semi-batch and continuous polymerization may be employed. If a polar coordinator is optionally added to the polymerization ingredients, amounts range between about 0.1 to about 90 or more equivalents per equivalent of the alkali metal. The amount depends on the type of polar coordinator that is employed, the amount of vinyl desired, the level of styrene employed and the temperature of the polymerizations, as well as the selected initiator.

According to the process of the invention, polymerization is begun by charging a blend of the monomer(s) and solvent to a suitable reaction vessel, followed by the addition of the initiator. The initiator is typically in the form of a slurry (suspension) in a hydrocarbon solvent that can be syringed into the reaction vessel. The degree of metalation of the initiator particle is determined by titration. As with the preparation of the initiator, the polymerization reaction is carried out under anhydrous, anaerobic conditions. Often, it is conducted under a dry, inert gas atmosphere. The polymerization can be carried out at any convenient temperature, such as about −30° C. to about 200° C. For batch polymerizations, it is preferred to maintain the peak temperature at from about 49° C. to about 149° C., and more preferably from about 80 ° C. to about 120° C. Polymerization is allowed to continue under agitation for about 0.15 to 24 hours.

After polymerization is complete, the resulting polymer is quenched by a terminating agent that may be a protic quenching agent such as water, steam or an alcohol such as isopropanol, or a functionalizing agent described below, to obtain a macro-branched diene polymer. The terminating agent is added to the reaction vessel, and the vessel is agitated for about 0.1 to about 4.0 hours. Quenching is usually conducted by stirring the polymer and quenching agent for about 0.25 hours to about 1.0 hour at temperatures of from about 30° C. to about 120° C. to ensure a complete reaction.

Lastly, the solvent is removed from the polymer by conventional techniques. These include steam or alcohol coagulation, thermal desolventization, or any other suitable method. Additionally, solvent may be removed by drum drying, extruder drying, vacuum drying or the like. Desolventization by drum-drying, coagulation in alcohol, steam or hot water desolventization, extruder drying, vacuum drying, spray drying, and combinations thereof are preferred. An antioxidant, such as butylated hydroxy toluene (BHT) and/or an antiozonant compound is usually added to the polymer or polymer cement at or before this stage.

Functionalizing agents may be employed as terminating agents. These agents are compounds that provide a functional group that remains on the end of the polymer chain. Any compounds providing terminal functionality (e.g., "endcapping") that are reactive with the polymer bound metal atom moiety can be selected to provide a desired functional group. However, it is preferable that the functionalizing agents are not also coupling agents (i.e., the functionalizing agents should not couple together the chain ends) so that the branched structure of the polymer is maintained. Functionalizing agents are particularly preferred when elastomers are polymerized by the process of the invention because the functional group promotes uniform and homogeneous mixing with fillers, such as silica and carbon black. Therefore, for example, compounding of vulcanizable macro-branched elastomers, prepared by the process of the invention, results in rubber products exhibiting improved physical properties, such as reduced hysteresis, which means a rubber product having increased rebound, decreased rolling resistance in tires, and lessened heat build-up when subjected to mechanical stress. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tributyl tin chloride, and mixtures of these. Further examples of reactive compounds include the terminators described in U.S. Pat. Nos. 5,066,729 and 5,521,309, the subject matter of which, pertaining to terminating agents and terminating reactions, is hereby incorporated by reference. The practice of the present invention is not limited solely to these terminators, since other compounds that are reactive with the polymer bound alkali metal atom can be selected to provide a desired functional group.

The preferred final polymerization product, the macro-branched diene polymer, resembles fish "caviar". This product, which contains the initiator particle, may then be compounded or milled to disperse the thermoplastic polymer particle or shear-degrade the cured elastomer particle in the center of the polymer, as described above, and reduce the polymer to a base molecular weight.

Usually each of the polymer chains of the macro-branched polymer have a molecular weight of about 20,000 to about 500,000, preferably about 100,000 to about 200,000, thus producing a macro-branched polymer having molecular weights that are several orders of magnitude higher than known linear polymers as measured by conventional gel permeation chromatographic (GPC) techniques. Preferably, the polydispersity (the ratio of the molecular weight to the number molecular weight) of the polymers can be controlled over a wide range, from 1 to about 20, preferably 1 to about 5, and more preferably 1 to about 2.

A theoretical calculation of the molecular weights possible for the macro-branched polymers is presented below. The calculation assumes a 200-mesh ground tire rubber particle and uses the initiator labeled #4 illustrated in Table 1.

Assuming particles are uniformly shaped spheres with:

$d = 74 \ \mu m$ $r = 37 \ \mu m$

Assuming uniform density of ground tire rubber as:

$$\rho = 1.16 * 10^6 \ \frac{gm}{m^3}$$

Surface Area of Sphere:

$$A = 4 * \pi * r^2$$

Volume of Sphere:

$$V = \frac{4}{3} * \pi * r^3$$

Mass of 1 particle:

$$mass = V * \rho = \frac{4}{3} * \pi * r^3 * \rho$$

$mass = 0.246 \ \mu gm$

Number particles per gm ground tire rubber:

$$\frac{\# \ particles}{gm \ ground \ tire} = \frac{1}{0.246 \ \mu gm} = 4.065 * 10^6 \ \frac{particles}{gm \ ground \ tire}$$

\# of living sites per particle:

$$\frac{\# \ living \ sites}{particle} = \frac{("X" \ mmol \ Li^+)}{(gm \ ground \ tire)} * \frac{(gm \ ground \ tire)}{("Y" \ \# \ particles)} *$$
$$\frac{(6.022 * 10^{23} \ molecules)}{(mol)} * \frac{(mol)}{(1000 \ mmol)}$$

$$\frac{\# \ living \ sites}{particle} = 6.0 * 10^{20} * \frac{X}{Y}$$

If 40 gm of monomers are polymerized using 10 cc of catalyst #4 (0.33 molar), the expected molecular weight would be:

MW=approximately 26,000

$$\frac{\# \ MW}{particle} = 1.6 * 10^{19} \ \frac{MW}{particle}$$

The highly branched polymers produced according to the invention exhibit desirable properties in addition to their extremely high molecular weight. For example, the polymers exhibit excellent oil absorption properties and are easily compounded. They are also readily mixed with other polymers, such as styrene butadiene rubber, natural rubber, polybutadiene, and the like, to form a polymer blend. The invention polymers also do not "cold flow" (i.e. a polymer "ball" retains its integrity as a ball over time, in contrast to a polymer that does exhibit "cold flow" and would "puddle").

The macro-branched polymers synthesized by the process of the invention may also be compounded to form vulcanizable elastomeric compounds and articles that exhibit excellent resistance to wear and tear and reduced hysteresis properties. Articles, such as tires, shock absorbers, mounts, power belts and the like, will show an increase in rebound, a decrease in rolling resistance and have less heat build-up when mechanical stresses are applied, resulting in improved fuel economy. Decreased rolling resistance is, of course, a useful property for pneumatic tires, both radial as well as bias ply types and thus, the vulcanizable elastomeric compositions of the present invention can be utilized to form treadstocks for such tires. The composition can also be used to form other elastomeric tire components such as subtreads, black sidewalls, body ply skims, bead fillers and the like.

The polymers of the present invention can be utilized as 100 parts of the rubber in the treadstock compound, or they can be blended with any conventionally employed treadstock rubber which includes natural rubber, synthetic rubber and blends thereof. When the polymers of the present invention are blended with conventional rubbers, the amounts can vary widely with a lower limit comprising about 10 to 20 percent by weight of the total rubber. The minimum amount will depend primarily upon the degree of hysteresis reduction desired. Thus, the compounds can contain 10 to 100% by weight of the inventive polymer, with the balance, if any, being a conventional rubber.

The polymers can be compounded with all forms of carbon black in amounts ranging from about 5 to 80 parts by weight, per 100 parts of rubber (phr), with about 35 to 60 phr being preferred. The carbon blacks may include any of the commonly available, commercially-produced carbon blacks. Examples of preferred carbon black compounds are described in U.S. Pat. No. 5,521,309, the subject matter of which, relating to carbon black compounds, is incorporated by reference herein. Silica can be used in place of all or part of the carbon black.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials", pp. 390–402. Vulcanizing agents can be used alone or in combination.

Vulcanizable elastomeric compositions of the invention can be prepared by compounding or mixing the macrobranched polymers herein, with carbon black and other conventional rubber additives including, for example, fillers, such as silica, plasticizers, antioxidants, curing agents and the like, using standard rubber mixing equipment and procedures. Such elastomeric compositions, when vulcanized using conventional rubber vulcanization conditions, have reduced hysteresis properties and are particularly adapted for use as tread rubbers for tires having reduced rolling resistance.

EXAMPLES AND GENERAL EXPERIMENTAL PROCEDURE

Initiator Preparation

In order to demonstrate the preparation and properties of the solid supported anionic initiators prepared according to the present invention, acetone-extracted ground cured rubber particles (i.e., substantially curative free particles) or styrene butadiene rubber particles or natural rubber particles were reacted with a lithium hydrocarbyl compound in the presence of a polar coordinator to form multi-lithiated particles. These initiators were then used to polymerize a solution of butadiene monomers. The described particles, alkyl metal compound, polar coordinator, and solvents are intended to be only examples of those that may be used in the process of the invention, and their particular use is not intended to be limiting, as other particles, alkali metal compounds, polar coordinators and solvents may be utilized by those skilled in the art.

Initiator Preparation Procedure

Example 1

This example describes the preparation of a solid supported initiator employing 200 mesh ground scrap tire rubber (Rouse Rubber Industries) as the particles. Prior to use in preparing the initiator, the particles were extracted with acetone for at least 16 hours to remove substantially all curing agents. The initiator was prepared in a 32-ounce beverage bottle that was dried by baking for at least 16 hours at 115° C. and then capped with a crown, two-hole cap and rubber liner. The bottle was cooled while purging with dry nitrogen and labeled as initiator #4. To the bottle was added 4.5 grams of the ground scrap rubber particles. The bottle was then capped and 50 grams of hexane was added, followed by purging with nitrogen. Then 1.9 milliliters (ml) of 6.62 molar (M) tetramethyl ethylene diamine (TMEDA) was added, followed by 100 grams of 3% by weight n-butyl lithium (BuLi) in hexane. The bottle was heated in a 50° C. rotating bottle bath for 24 hours. The bottle was then removed from the bottle bath and allowed to cool to room temperature.

To remove any free BuLi remaining, an initial hexane dilution was added (55 grams) and the bottle was allowed to sit still while the particles in the bottle fell to the bottom. The top layer of solvent was then removed (96 grams), and a second dilution of hexane was added (113 grams). The bottle was vigorously shaken and then allowed to sit while the particles again fell to the bottom. The second solvent extract was then removed from the bottle (109 grams). A third dilution was added (102 grams) of hexane, a third extraction was performed (206 grams) and the particles were then re-suspended in 50 grams of hexane. The resulting suspension contained 4.5 grams of lithiated ground scrap tire rubber in 59 grams of hexane. Analysis by butane evolution after alcohol termination gave 89% of the BuLi as reacted, and thus the final suspension had a concentration of 0.33 M.

The solid supported initiator in suspension was then stored under pressure in a cool environment (refrigerator) to prevent decomposition of the initiator.

This procedure was used to prepare different solid supported initiators employing cured elastomers as the particles with the variations in ingredients and ingredient concentrations as listed in Table 1. Some properties of the initiators are also included in Table 1.

As illustrated in Table 1, as the ratio of TMEDA to BuLi decreased from about 2:1 to about 0.25:1, and from thence to 0.135 and 0.067, the millimoles of lithium covalently bonded per gram of rubber, the molar concentration of particle lithium, and the percentage of BuLi that reacted increased significantly. The percentage of free BuLi in the initiator solution is a function of the degree of washing with solvent after the initiator is formed.

Example 2

This example describes the preparation of an initiator using a thermoplastic polymer as the particle. The polymer employed is a copolymer of modified styrenes having a molecular weight of 2,900 and $T_g$ of 100° C., with the brand name ENDEX® 155 (Hercules Inc., Wilmington, Del.). The initiator was prepared in a 32-ounce beverage bottle that was dried by baking for at least 16 hours at 115° C. and then capped with a crown, two-hole cap and rubber liner. The bottle was cooled while purging with dry nitrogen. To the bottle was added 5 grams of ENDEX®. Fifteen to 20 dry marbles were added to the bottle. The bottle was then capped and 35 ml of hexane was added, followed by purging with nitrogen. Then 1.2 ml of 6.62M TMEDA was added, followed by 15 ml of a 1.6M solution of BuLi in hexane. The bottle was heated in a 50° C. rotating bottle bath for 24 hours. The bottle was then removed from the bottle bath, allowed to cool to room temperature, and excess liquid was removed. The bottle was vigorously shaken on a mechanical shaker to smash large particles into small ones. The particles were then re-suspended in 50 grams of hexane. The solid supported initiator in suspension was then stored under pressure in a cool environment (refrigerator) to prevent decomposition of the initiator.

Polymer Preparation

The following examples illustrate the process of the invention for the preparation of macro-branched diene polymers using the invention initiators. However, the examples are not intended to be limiting, as other methods for preparing these macro-branched diene polymers from the invention initiators may be determined by those skilled in the art.

The polymer was prepared in a 32-ounce beverage bottle that was dried by baking for at least 16 hours at 115° C. and then cooled while purging with dry nitrogen. The bottle was then capped with a crown, two-hole cap and rubber liner, pressure checked and again nitrogen purged. The bottle was labeled as polymer #P-18 and then placed in a bottle guard. To the bottle was added 50 grams of hexane, followed by 150 grams of 33% by weight butadiene in hexane. Finally, 5 ml of invention initiator #4, prepared as in Example 1, was added. The bottle was inserted into a 50° C. rotating bottle bath for 24 hours. The bottle was then removed from the bottle bath and 2.0 ml of isopropanol (neat) was added to terminate the polymer. The bottle was then allowed to cool to room temperature. The contents in the bottle appeared more as a "solid" than a "liquid", and appeared very similar to a fish "caviar". The hexanes in the bottle were swollen in the polymer that was produced.

The bottle was vented, then cut open and the polymer was isolated by removing the solvent on a drum dryer. The resulting processed product sheeted on the rolls of the drum dryer and was easily gathered.

Analysis of the polymer showed a 100% conversion of monomer to give a Mooney viscosity at 100° C. of 108.8. The polymer was 23.6% soluble in toluene and analysis of the soluble polymers by GPC gave a number molecular weight (Mn) of 130,200 grams per mole and a polydispersity of 3.56. The $T_g$ was $-57.0°$ C., measured at midpoint. This $T_g$ corresponds to a microstructure of 57% vinyl polybutadiene.

Characterization of the Polymers

The data of Table 2 illustrate properties of polymers similarly prepared employing the initiators described in Table 1. Some of the polymers are copolymers of butadiene and styrene, prepared by standard polymerization procedures known to those skilled in the art.

The appearance of the some of the polymers was "caviar", indicating that there was little free butadiene homopolymer produced and, therefore, there was little free BuLi remaining in the initiator preparation that was employed. Other preferred polymers appeared as a "caviar sludge", indicating a small amount of homopolymerized butadiene. Other polymers appeared as a "slurry" or an "oily sludge". Some of the polymerization reactions resulted in a low conversion of monomer to polymer ("Low Conv"). Other polymerization reactions resulted in an undesirably high degree of homopolymerization of the monomers in addition to production of macro-branched polymers ("High homo pzn").

The preferred polymers were macro-branched, having high number molecular weights (Mn) ranging from 72,000 to 594,000, Mooney viscosities at 100° C. ranging from 35 to 135, with a low polydispersity, a low 1,2-microstructure, and a $T_g$ between $-35°$ C. and $-75°$ C., preferably about $-35°$ C. to $-55°$ C. As expected, polymers containing styrene showed a higher $T_g$ than those without styrene. However, all of the prepared polymers listed in Table 2 had an acceptable $T_g$ of less than $-20°$ C. Preferred polymers also had a high percentage of conversion of monomers and a low percentage of "soluble" polymer (i.e., free homopolymer). Exemplary preferred polymers shown in Table 2 are #P-10 made with initiator #3; #P-18, #P-19, #P-20 and #P-25 all made with initiator #4; #P-35 made with initiator #7; #P-37 made with initiator #8; #P-53 made with initiator #9; #P-54 and #P-55 made with initiator #10, and #P-62 and #P-63 made with initiator #11.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

TABLE 1

CHARACTERIZATION OF INITIATOR #1

| Initiator # | Part. Type | Mesh Size | Part. Wt. (gm) | BuLi gm (%) | BuLi (mmol) | TMEDA (mmol) | TMEDA: BuLi Ratio | Total Reactants (cc) | % BuLi Reacted | Li/particle in slurry (mmol/g) | Molar Conc. Particle Lithium | BuLi Residue (M) | Total Lithium In Initiator Solution (M) | % Free BuLi in Initiator Solution |
|---|---|---|---|---|---|---|---|---|---|---|---|---|---|---|
| 1 | Scrap | 200 | 2.0 | 100 (3) | 46.9 | 99.30 | 2.118 | | | | | | | |
| 2 | Scrap | 200 | 4.0 | 100 (3) | 46.9 | 99.30 | 2.118 | | | | | | | |
| 3 | Scrap | 200 | 4.5 | 100 (3) | 46.9 | 25.16 | 0.537 | 92 | 13 | 1.4 | 0.067 | 0.0071 | 0.074 | 9.6 |
| 4 | Scrap | 200 | 4.5 | 100 (3) | 46.9 | 12.58 | 0.268 | 89 | 27 | 2.8 | 0.142 | 0.0043 | 0.146 | 3.0 |
| 5 | Scrap | 200 | 4.0 | 21 (15) | 49.2 | 12.58 | 0.256 | 134 | 89 | 11.0 | 0.328 | 0.0002 | 0.329 | 0.1 |
| 6 | Scrap | 200 | 4.0 | 21 (15) | 49.2 | 6.62 | 0.135 | 147 | 83 | 10.2 | 0.279 | 0.0008 | 0.279 | 0.3 |
| 7 | Scrap | 200 | 4.0 | 21 (15) | 49.2 | 3.31 | 0.067 | 143 | 77 | 9.5 | 0.265 | 0.0008 | 0.266 | 0.3 |
| 8 | Scrap | 200 | 4.0 | 10 (15) | 23.4 | 12.58 | 0.537 | 108 | 94 | 5.5 | 0.206 | 0.0000 | 0.206 | 0.0 |
| 9 | SBR** | 32 | 4.0 | 100 (3) | 46.9 | 99.30 | 2.118 | 197 | 19 | 2.2 | 0.046 | 0.0206 | 0.066 | 31.1 |
| 10 | SBR | 32 | 4.0 | 100 (3) | 46.9 | 99.30 | 2.118 | 248 | 16 | 1.8 | 0.029 | 0.0204 | 0.050 | 41.1 |

TABLE 1-continued

CHARACTERIZATION OF INITIATOR #1

| Initiator # | Part. Type | Mesh Size | Part. Wt. (gm) | BuLi gm (%) | BuLi (mmol) | TMEDA (mmol) | TMEDA: BuLi Ratio | Total Reactants (cc) | % BuLi Reacted | Li/particle in slurry (mmol/g) | Molar Conc. Particle Lithium | BuLi Residue (M) | Total Lithium In Initiator Solution (M) | % Free BuLi in Initiator Solution |
|---|---|---|---|---|---|---|---|---|---|---|---|---|---|---|
| 11 | NR*** | 18 | 4.0 | 100 (3) | 46.9 | 99.30 | 2.118 | 186 | 19 | 2.2 | 0.048 | 0.0184 | 0.067 | 27.6 |
| 12 | NR | 18 | 4.0 | 100 (3) | 46.9 | 99.30 | 2.118 | 214 | 21 | 2.5 | 0.046 | 0.0117 | 0.058 | 20.2 |

*Ground Scrap Tire Rubber Supplied by Rouse Rubber Industries
**Styrene Butadiene Rubber
***Natural Rubber

TABLE 2

CHARACTERIZATION OF FINAL POLYMERS

| Polymer # | Initiator # | Stock Age (Days) | Amt. Used (cc) | ML4 | $T_g$(° C.) midpoint | % Styrene | % 1,2 Bd* (calc.from Tg) | % Monomer Converted | % Souble Polymer | Extract Mn | Poly disp. | Notes |
|---|---|---|---|---|---|---|---|---|---|---|---|---|
| P-1 | 1 | 1 | 10 | 128.5 | −33 | 0 | 76.8 | NA | 11.4 | 93600 | 2.94 | |
| P-2 | 1 | 1 | 10 | 88.5 | −29 | 0 | 79.8 | NA | 32.2 | 151000 | 2.94 | |
| P-3 | 2 | 1 | 5 | 88.3 | −34 | 0 | 76.1 | NA | 7.4 | 96900 | 7.28 | |
| P-4 | 2 | 1 | 10 | 159.0 | −32 | 0 | 77.6 | NA | 33.9 | 125100 | 1.84 | |
| P-5 | 2 | 1 | 10 | 89.1 | −29 | 0 | 79.8 | NA | 16.9 | 237000 | 1.75 | |
| P-6 | 2 | 9 | 10 | 89.6 | −32 | 0 | 77.6 | 100.0 | 16.0 | 255300 | 1.99 | |
| P-7 | 2 | 9 | 10 | 104.2 | −30 | 10 | 76.7 | 86.1 | 17.3 | 193000 | 2.74 | |
| P-8 | 2 | 9 | 10 | 134.6 | −24 | 20 | 76.9 | 85.5 | 21.0 | 100300 | 4.51 | |
| P-9 | 2 | 9 | 10 | 133.4 | −22 | 25 | 74.9 | 93.6 | 19.0 | 158700 | 2.71 | |
| P-10 | 3 | 7 | 5 | 79.0 | −39 | 0 | 72.1 | 85.0 | 22.6 | 220400 | 2.86 | |
| P-11 | 3 | 7 | 5 | 109.9 | −30 | 17 | 72.8 | 45.0 | 14.0 | 101500 | 6.27 | |
| P-12 | 3 | 7 | 5 | 110.7 | −28 | 22 | 70.9 | 46.0 | 12.8 | 101400 | 7.01 | |
| P-13 | 3 | 7 | 5 | 112.8 | −22 | 25 | 74.9 | 90.0 | 21.1 | 203700 | 2.95 | |
| P-14 | 3 | 24 | 10 | 125.4 | −41.0 | 0 | 70.5 | 87.5 | 81.8 | 156000 | 1.80 | Slurry |
| P-15 | 3 | 24 | 10 | 129.8 | −40.5 | 0 | 71.0 | 90.0 | 64.6 | 162000 | 1.80 | Slurry |
| P-16 | 3 | 28 | 10 | 124.5 | −41.5 | 0 | 70.0 | 87.0 | 51.5 | 167500 | 1.79 | |
| P-17 | 3 | 28 | 10 | 125.7 | −57.0 | 0 | 56.7 | 87.0 | 65.3 | 156200 | 1.80 | |
| P-18 | 4 | 7 | 5 | 108.8 | −57 | 0 | 56.7 | 100.0 | 23.6 | 130200 | 3.56 | |
| P-19 | 4 | 7 | 5 | 89.0 | −38 | 14 | 66.7 | 100.0 | 15.1 | 236000 | 3.23 | |
| P-20 | 4 | 7 | 5 | 90.7 | −33 | 23 | 64.2 | 100.0 | 23.7 | 370700 | 2.25 | |
| P-21 | 4 | 7 | 5 | 114.1 | −29 | 31 | 58.1 | 78.0 | 15.1 | 222500 | 2.85 | |
| P-22 | 4 | 24 | 10 | 141.2 | −56.5 | 0 | 57.1 | 87.5 | 85.4 | 112400 | 2.18 | Slurry |
| P-23 | 4 | 24 | 10 | 130.8 | −59.0 | 0 | 54.8 | 60.0 | 98.4 | 175300 | 1.86 | Slurry |
| P-24 | 4 | 28 | 10 | 132.3 | −57.0 | 0 | 56.7 | 78.0 | 85.8 | 192900 | 1.75 | |
| P-25 | 4 | 28 | 10 | 142.1 | −29.5 | 33 | 53.7 | 89.0 | 78.1 | 206900 | 2.27 | |
| P-26 | 5 | 1 | 10 | 42.1 | −62.5 | 0 | 51.4 | 79.8 | 95.8 | 111700 | 1.82 | |
| P-27 | 5 | 1 | 10 | 50.3 | −46.0 | 20 | 52.0 | 85.0 | 97.6 | 102400 | 2.17 | |
| P-28 | 5 | 2 | 10 | 120.4 | −47.0 | 17 | 54.2 | 85.8 | 92.2 | 151900 | 2.55 | Caviar sludge |
| P-29 | 6 | 1 | 10 | Too Low | −76.0 | 0 | 37.0 | 88.0 | 99.4 | 72400 | 1.35 | |
| P-30 | 6 | 1 | 10 | Too Low | −55.0 | 20 | 39.8 | 92.0 | 100.0 | 60800 | 1.61 | |
| P-31 | 6 | 2 | 10 | Too Low | −57.0 | 17 | 41.6 | 89.2 | 99.5 | 75900 | 1.75 | Oily sludge |
| P-32 | 7 | 1 | 10 | Too Low | −79.0 | 0 | 33.4 | 84.0 | 98.3 | 72000 | 1.58 | |
| P-33 | 7 | 1 | 10 | 46.4 | −66.5 | 20 | 21.6 | 80.0 | 99.4 | 116300 | 1.48 | |
| P-34 | 7 | 2 | 10 | 125.7 | −65.0 | 17 | 30.1 | 90.0 | 99.8 | 107000 | 1.60 | High homo pzn* |
| P-35 | 7 | 25 | 5 | 82.1 | −34.5 | 25 | 59.0 | 90.6 | | 543600 | | Caviar |
| P-36 | 8 | 1 | 10 | 125.7 | −38.5 | 20 | 61.0 | 88.0 | 61.4 | 208000 | 2.66 | |
| P-37 | 8 | 2 | 10 | 94 | −34.5 | 16 | 68.9 | 90.0 | 4.2 | 594000 | 2.37 | Caviar |
| P-38 | 8 | 2 | 10 | 107.8 | −53.5 | 0 | 59.8 | 93.8 | 56.0 | 248200 | 1.86 | Caviar Sludge |
| P-39 | 8 | 2 | 10 | 156 | −35.5 | 18 | 66.2 | 93.5 | 34.5 | 185200 | 2.35 | Caviar Sludge |
| P-40 | 8 | 2 | 20 | 144.5 | −45.5 | 0 | 66.8 | 88.0 | 71.7 | 189700 | 1.78 | Caviar Sludge |
| P-41 | 8 | 25 | 10 | | −85.0 | 0 | 25.5 | 86.4 | | 300200 | 1.38 | High homo pzn* |
| P-42 | 8 | 25 | 10 | | −75.0 | 5 | 33.3 | 97.0 | | 457300 | 1.97 | High homo pzn* |

TABLE 2-continued

CHARACTERIZATION OF FINAL POLYMERS

| Polymer # | Initiator # | Stock Age (Days) | Amt. Used (cc) | ML4 | $T_g$(° C.) midpoint | % Styrene | % 1,2 Bd* (calc.from Tg) | % Monomer Converted | % Souble Polymer | Extract Mn | Poly disp. | Notes |
|---|---|---|---|---|---|---|---|---|---|---|---|---|
| P-43 | 8 | 25 | 10 |  | −79.0 | 5 | 30 | 85.6 |  | 313700 | 1.48 | High homo pzn* |
| P-44 | 8 | 25 | 10 |  | −73.5 | 8 | 29 | 80.3 |  | 219800 | 1.41 | High homo pzn* |
| P-45 | 8 | 25 | 10 |  | −73.5 | 10 | 25 | 78.8 |  | 239200 | 1.44 | High homo pzn* |
| P-46 | 8 | 25 | 10 |  | −71.5 | 11 | 25 | 80.3 |  | 211600 | 1.41 | High homo pzn* |
| P-47 | 9 | 1 | 10 | 132.9 | −35 | 0 | 79.1 | 95.0 | 70.8 | 194800 | 1.59 |  |
| P-48 | 9 | 6 | 5 | 106.8 | −37 | 0 | 77.6 | 91.3 | 46.4 | 298600 | 1.89 |  |
| P-49 | 9 | 6 | 5 | 121.0 | −34 | 4.2 | 79.0 | 88.0 | 59.8 | 226900 | 1.68 |  |
| P-50 | 9 | 6 | 5 | 111.7 | −32 | 8.3 | 79.9 | 85.0 | 40.1 | 268100 | 1.65 |  |
| P-51 | 9 | 6 | 5 | 112.4 | −26 | 16.7 | 81.9 | 92.0 | 18.2 | 408600 | 1.79 |  |
| P-52 | 9 | 6 | 5 | 129.3 | −36 | 20.8 | 68.4 | 47.5 | 26.3 | 490000 | 2.10 | Low Sty Conv.** |
| P-53 | 9 | 20 | 10 | 108.3 | −37.0 | 0 | 73.8 | 89.0 | 23.6 | 210500 | 2.24 |  |
| P-54 | 10 | 3 | 10 | NA | −36 | 0 | 74.5 | 23.0 | 11.5 | 385500 | 3.04 |  |
| P-55 | 10 | 10 | 2 | 106.7 | −40 | 0 | 75.2 | 98.3 | 10.6 | 308500 | 1.78 | Caviar Looking |
| P-56 | 10 | 10 | 4 | 127.5 | −35 | 0 | 79.1 | 86.0 | 85.2 | 146700 | 1.62 | Slurry |
| P-57 | 10 | 10 | 8 | 126.5 | −34 | 0 | 76.1 | 82.0 | 79.3 | 166400 | 1.63 | Slurry |
| P-58 | 10 | 10 | 16 | 122.5 | −34 | 0 | 76.1 | 90.0 | 43.8 | 205300 | 1.54 | Slurry |
| P-59 | 10 | 17 | 10 | NA | −35.5 | 0 | 74.7 | 13.0 | 19.6 | 172500 | 6.55 | Low Conv |
| P-60 | 11 | 1 | 10 | 109.1 | −35 | 0 | 79.1 | 90.0 | 13.5 | 213900 | 2.10 |  |
| P-61 | 11 | 20 | 10 | 122.1 | −36.0 | 0 | 74.5 | 86.0 | 10.6 | 173800 | 2.17 |  |
| P-62 | 11 | 20 | 10 | 106.2 | −30.5 | 10 | 76.1 | 89.0 | 14.0 | 399600 | 1.80 |  |
| P-63 | 11 | 20 | 10 | 105.5 | −24.0 | 20 | 76.9 | 88.0 | 18.2 | 374300 | 2.29 |  |
| P-64 | 12 | 3 | 10 | 129.9 | −36 | 0 | 74.5 | 89.5 | 47.1 | 175000 | 1.54 |  |
| P-65 | 12 | 10 | 4 | NA | −39 | 0 | 72.1 | 15.0 | 17.8 | 401000 | 2.46 | Low Conv |
| P-66 | 12 | 10 | 8 | 123.0 | −38 | 0 | 76.8 | 90.8 | 70.4 | 173000 | 1.65 | Slurry |
| P-67 | 12 | 10 | 16 | 97.5 | −35 | 0 | 79.1 | 92.3 | 81.7 | 125000 | 1.65 | Slurry |
| P-68 | 12 | 17 | 10 | 96.0 | −36.5 | 0 | 74.1 | 88.0 | 15.1 | 164600 | 3.63 |  |

*high amount of homopolymerization of butadiene
**low conversion of styrene

We claim:

1. A method of preparing an anionic polymerization initiator, comprising the step of:
    reacting (i) an alkali metal compound having the formula R(Me), where R represents a hydrocarbyl group containing from one to about 20 carbon atoms, and Me is a Group IA alkali metal,
    with (ii) a metalatable particle having a diameter of about 1 micron to about 1000 microns comprising a thermoplastic polymer or a cured rubber,
    in the presence of (iii) a polar coordinator, wherein the molar ratio of the polar coordinator to the alkali metal compound is about 0.03:1 to less than 2:1,
    to form a reaction product having the formula P(Me)$_n$ wherein P represents the particle having covalently bonded alkali metal atoms, and n is an integer equal to or greater than 3.
2. The method of claim 1, wherein the alkali metal is lithium or sodium or potassium.
3. The method of claim 2, wherein the alkali metal is lithium.
4. The method of claim 1, wherein the alkali metal compound represents a mixture of a lithium compound and a selection from at least one of a sodium compound, a potassium compound, a rubidium compound, a cesium compound and a francium compound.
5. The method of claim 1, wherein the R group is selected from aliphatic and cyclo-aliphatic groups consisting essentially of alkyls, cycloalkyls, alkenyls, alkynyls, aryls, aralkyls, and combinations thereof.
6. The method of claim 1, wherein the alkali metal compound is n-butyl lithium.
7. The method of claim 1, wherein the polar coordinator is selected from the group consisting essentially of tetrahydrofuran, linear oligomeric oxolanyl alkanes, cyclic oligomeric oxolanyl alkanes, dialkyl ethers of mono and oligo alkylene glycols, crown ethers, fully alkylated diamines, fully alkylated triamines, and mixtures thereof.
8. The method of claim 1, wherein the molar ratio of the polar coordinator to the alkali metal compound is about 0.03:1 to about 4:1.
9. The method of claim 8, wherein the molar ratio is about 0.05:1 to about 1:1.
10. The method of claim 9, wherein the molar ratio is about 0.06:1 to about 0.5:1.

* * * * *

UNITED STATES PATENT AND TRADEMARK OFFICE
CERTIFICATE OF CORRECTION

PATENT NO. : 6,384,150 B2
DATED : May 7, 2002
INVENTOR(S) : William L. Hergenrother et al.

It is certified that error appears in the above-identified patent and that said Letters Patent is hereby corrected as shown below:

<u>Column 17,</u>
Line 50, "with (ii) a metalatable" should read -- with (ii) a metalable --;
Line 51-52, "a thermo-plastic polymer or a cured rubber" should read
-- a thermo plastic homopolymer or a cured rubber --.

Signed and Sealed this

Thirtieth Day of March, 2004

JON W. DUDAS
*Acting Director of the United States Patent and Trademark Office*